Patented Apr. 20, 1926.

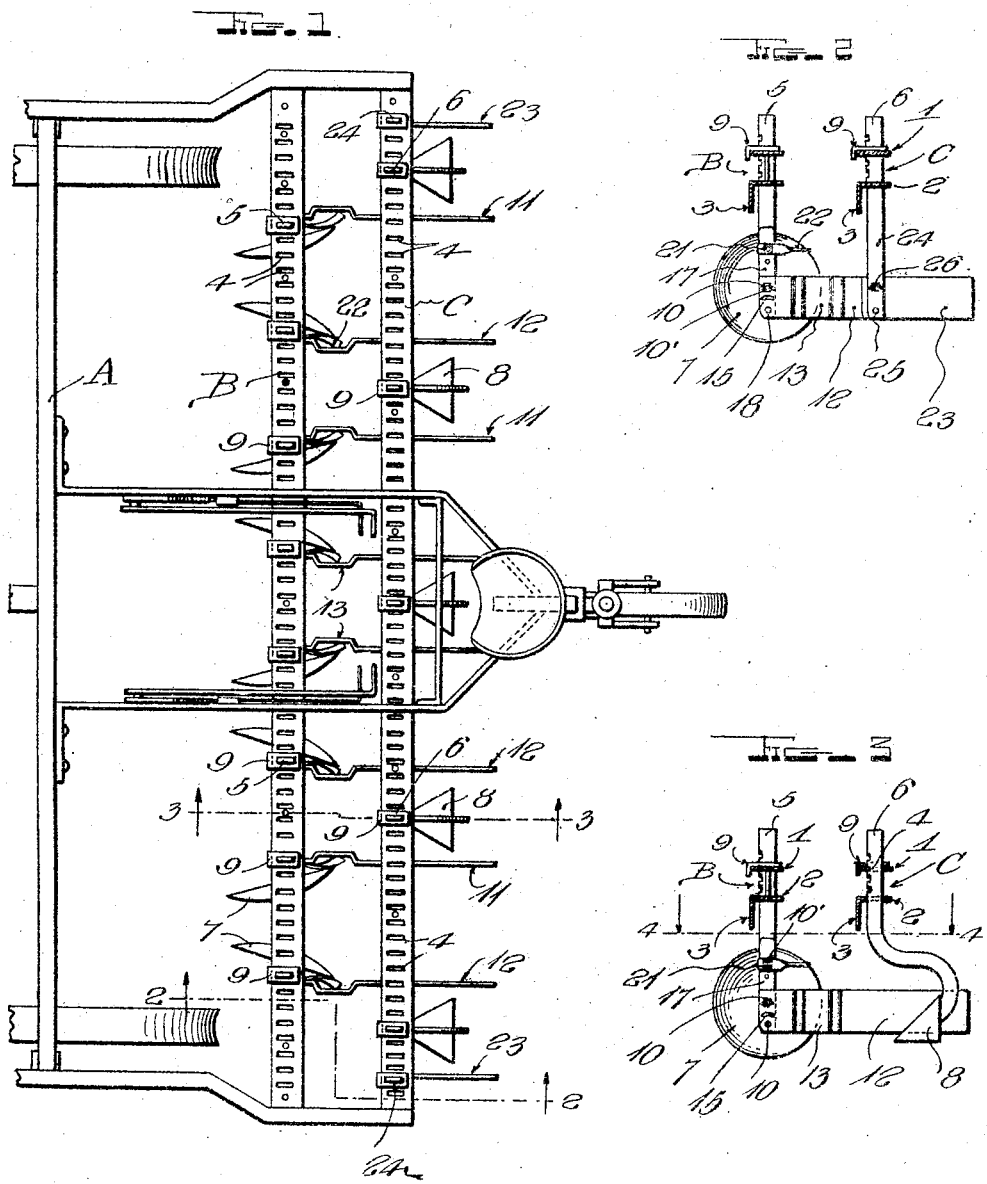

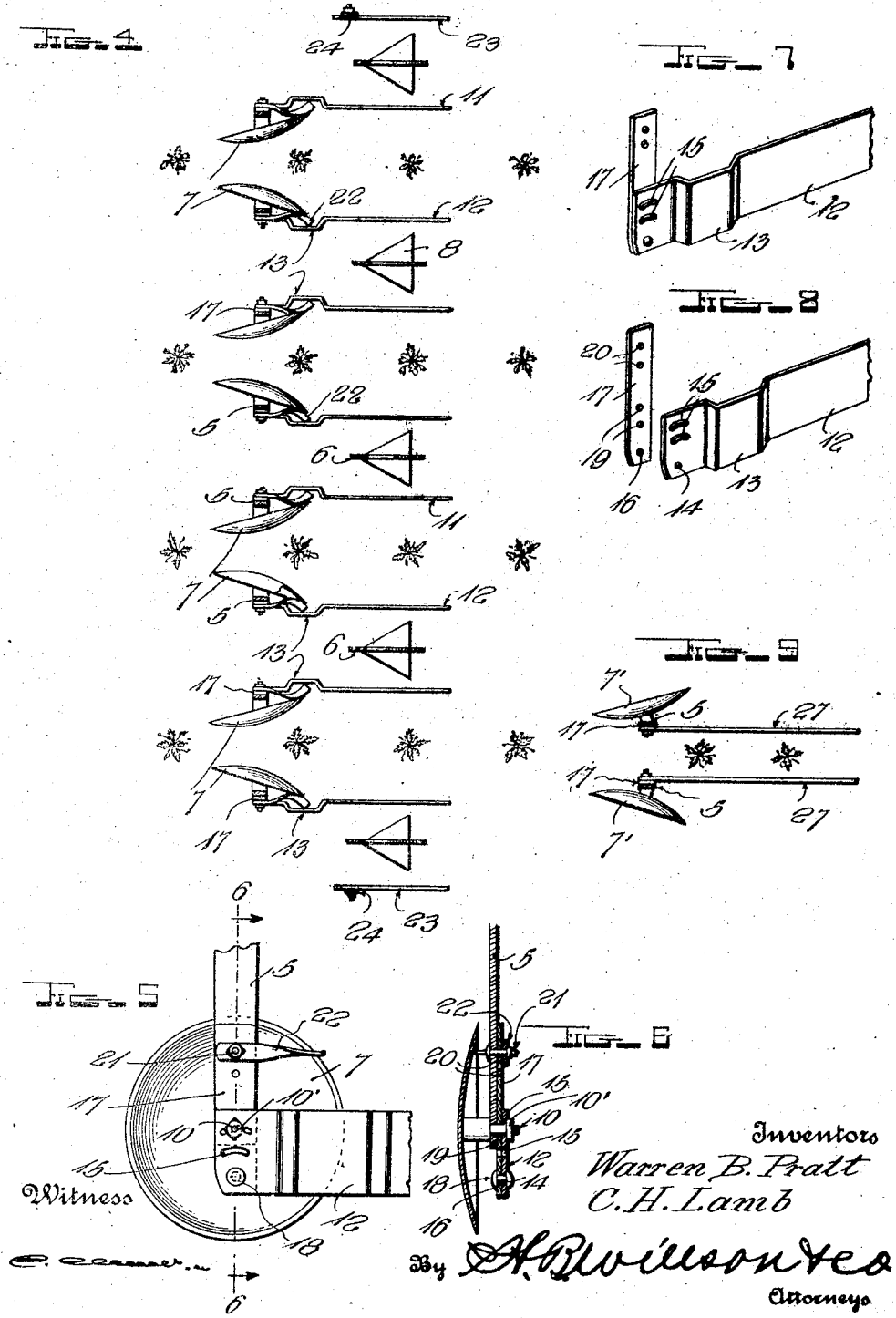

1,581,227

UNITED STATES PATENT OFFICE.

WARREN B. PRATT AND CHARLES HOWARD LAMB, OF PROCTOR, COLORADO.

PLANT GUARD FOR CULTIVATORS.

Application filed September 25, 1924. Serial No. 739,895.

*To all whom it may concern:*

Be it known that we, WARREN B. PRATT and CHARLES H. LAMB, citizens of the United States, residing at Proctor, in the county of Logan and State of Colorado, have invented certain new and useful Improvements in Plant Guards for Cultivators; and we do declare the following to be a full, clear, and exact description of the invention, such as will enable others skilled in the art to which it appertains to make and use the same.

This invention relates to an improved plant guard for use in connection with a straddle row cultivator so that when small plants such as beets or the like are being cultivated, the throwing of dirt upon the small plants will be prevented. When a cultivator of this type is in use and no protector provided for the young plants, the earth dug up between the rows of plants will often be thrown upon the plants so that they are smothered and caused to die.

One object of the invention is therefore to provide a guard or shield which can be used in connection with a conventional construction of cultivator and to further so construct the guards that they may be easily and quickly applied.

Another object is to so construct the guards that when in place, they may be vertically adjusted so that they are properly positioned with respect to the ground and to further so mount them that they may be angularly adjusted to properly position them and compensate for wear caused by their rear end portions engaging the ground.

Another object of the invention is to provide guards which may be formed from strips of heavy sheet metal and therefore produced at a small cost.

This invention is illustrated in the accompanying drawings, wherein:

Figure 1 is a top plan view of a conventional type of cultivator with the improved guard applied to it.

Figure 2 is a transverse sectional view taken along the line 2—2 of Fig. 1.

Figure 3 is a transverse sectional view taken along the line 3—3 of Fig. 1.

Figure 4 is a horizontal sectional view through the cultivator taken along the line 4—4 of Fig. 3.

Figure 5 is an enlarged fragmentary view in side elevation showing the manner of connecting a guard with the cultivator.

Figure 6 is a vertical sectional view taken along the line 6—6 of Fig. 5.

Figure 7 is a perspective view of one of the guard strips together with its attaching bar.

Figure 8 is a view similar to Fig. 7 showing the attaching bar separate from the guard strip.

Figure 9 is a fragmentary view similar to a portion of Fig. 4 and showing a modified form of guard strip.

The cultivator shown in the accompanying drawings is of a conventional construction and will be provided with a frame indicated in general by the letter A and including cross bars B and C. Each of the cross bars is provided with upper and lower strips 1 and 2, the upper strip being a flat strip and the lower strip being formed of angle iron to provide a depending front flange 3. These strips 2 and 3 are provided with slots 4 to receive the standards 5 and 6, the standard carried by the forward bar B serving to carry the disks 7 and the standard 6 carried by the rear bar C serving to carry the cultivator blades 8. These standards 5 and 6 are provided with the usual notches for receiving the upper strips 1 and will be held in a desired vertically adjusted position by the usual fastener plates 9. The cultivator blades or shovels 8 will also be connected with the rear standard in a conventional manner and the forward disks 7 rotatably connected with the forward standard in the usual manner by having shafts forming bolts 10 extended through openings formed in the lower ends of the standards.

The construction so far described is common to cultivators already in use and it will be readily seen that the guards forming the subject matter of this invention can be sold in connection with a cultivator or can be sold separately as an accessory or attachment to be applied to a cultivator already in use. It will be further understood that the protector strips or shields may be used in connection with cultivators modified in their specific construction, one example of which has been shown in Fig. 9, where the disks 7 have their pivot bolts extending from their convexed faces instead of their concaved faces. The improved plant protecting strips could in fact be used in connection with any type of cultivator having forward and rear earth-working implements including vertical standards connected with the frame portion of the machine in any desired manner.

When used in connection with a cultivator of the type shown in Figs. 1 and 4 with the shaft forming bolts 10 extending from the concave sides of the disks 7, the plant protecting strips will be formed as shown in Figs. 7 and 8. These strips which are indicated by the numerals 11 and 12 extend upon opposite sides of a row of plants as shown in Fig. 4 and will be of sufficient length to extend rearwardly from the disks 7 to a point rearwardly beyond the cultivator blades or shovels 8. Each of the strips has been bent adjacent its forward end to provide an offset portion 13 to receive the rear portion of the disks 7 from which it extends, and thereby prevents the plant protecting strips from interfering with proper rotation of the disks 7. The forward end portion of each strip is provided with a lower fastener-receiving opening 14 and above this opening 14 there has been provided arcuate slots 15. The opening 14 registers with an opening 16 formed in the lower end of a mounting bar 17 so that a fastener rivet 18 may be passed through these openings as shown in Fig. 6 and pivotally connect the plant protecting strips with the mounting bar. Therefore, when the plant protectors are in use, they may be tilted vertically to place them at the desired angle with respect to the ground and as the rear end portions are worn off through engagement with the ground, the strips may be adjusted so that they will be again properly positioned. Openings 19 are formed in the mounting bar to register with the slots 15 and the upper end portion of this bar 17 is provided with a pair of openings 20. The openings 19 and 20 and slots 15 have been formed in pairs so that when put in place the mounting bar may be vertically adjusted and the shaft-forming bolts 10 passed through a selected opening 19 and slot 15 and the bolt 21 which holds the scraper 22 and upper portion of the bar 17 in place passed through a selected opening 20. By this arrangement, the bolts 10 and 21 ordinarily made use of for mounting the disks and scrapers may be made use of to secure the attachment in place upon the lower end portions of the standards 5. The plant protecting attachment may therefore be easily put in place and so mounted that the lower ends of the mounting bars and forward ends of the strips 11 and 12 will be positioned the proper distance above the ground and after being put in place the strips may be angularly adjusted and the securing nuts 10' for the bolts 10 then tightened to retain the strips in the angularly adjusted position.

The protecting strips 23 provided at the sides of the cultivator are formed as straight strips which are shorter than the strips forming the plant protectors 11 and 12. These strips 23 have their rear ends in alinement with the rear ends of the strips 11 and 12 and have their forward ends terminating in alinement with the rear ends of the offset portions 13. Each of the strips 23 is provided with an attaching bar or standard 24 to which it is pivotally connected by means of a rivet or other pivot fastener 25. A bolt 26 passes through registering openings formed in the strips 23 and standard 24, one of said openings being in the form of an arcuate slot so that the strip 23 may be angularly adjusted and secured in the desired position. The standard 24 projects through openings in the upper and lower strips of the rear cross bar C and will be releasably held in a vertically adjusted position in the same manner that the standards 5 and 6 are held. It will therefore be seen that the protecting strips may also be vertically adjusted with respect to the ground as well as angularly adjusted.

Referring to the form shown in Fig. 9, it will be seen that these strips 27 are formed as straight strips. It is not necessary to provide these strips with the offset portions 13 as the disks 7' have their convex sides toward the standards with which they are connected and therefore they extend rearwardly in diverging relation instead of in converging relation. The rear portions of these disks therefore extend away from the strips 27 and it is not necessary to provide offset portions to permit the plant protecting strips to be extended rearwardly without contacting with the disks. The mounting arms for these strips 27 will be the same as used in connection with the strips 11 and 12 and therefore are indicated by the same numerals 17. The same method of attaching the strips 27 to the mounting bars will also be made use of, and therefore does not need to be specifically illustrated in connection with this form.

It will thus be seen that there has been provided plant protecting strips which can be readily connected with a cultivator to be sold or to one already in use. When in place, they extend rearwardly between the shovels 8 upon opposite sides of the rows of plants and as the machine moves across a field, the strips or protectors will prevent the earth thrown up by the shovels from being thrown upon the small plants.

I claim:—

1. The combination with a straddle row cultivator including a frame having forward and rear cross bars, and forward and rear ground-working elements having standards connected to the forward and rear bars of said frame, of plant shielding members connected to the forward ground-working elements and extending rearwardly therefrom upon opposite sides of the rear ground-working elements and rearwardly beyond the same and adapted to be disposed between the rear ground-working elements and rows of plants as the cultivator is drawn across a field.

2. The combination with a straddle row cultivator including a frame having forward and rear cross bars, and forward and rear ground-working elements having standards connected to the forward and rear cross bars for vertical adjustment, of plant-protecting members connected to the standards of the forward ground-working elements and extending rearwardly upon opposite sides of the rear ground-working elements, said plant protectors being adapted to be swung vertically for angular adjustment relative to the ground and means for releasably securing the plant protectors in an adjusted position.

3. The combination with a straddle row cultivator including a frame having forward and rear cross bars and forward and rear ground-working elements having standards connected to these forward and rear cross bars, of plant shielding means comprising mounting bars secured vertically to the standards of the forward ground-working elements and extending downwardly beneath the standard, strips pivotally connected to the lower ends of said mounting bars and extending rearwardly from the forward ground working elements upon opposite sides of the rear ground-working elements and means for releasably securing the plant protecting strips to portions of the forward ground working elements in angularly adjusted position.

4. The combination with a straddle row cultivator including a frame and forward and rear ground-working elements carried thereby, the forward ground-working elements including standards and blades having fasteners passing through the standards, of plant protectors comprising mounting bars secured to the lower end portions of said standards and extending beneath the same, and plant shielding strips pivotally connected to the lower ends of said mounting bars and extending rearwardly upon opposite sides of the rear ground working elements, the forward end portions of said strips above their pivotal connections to the mounting bars being provided with arcuate slots and the fasteners for the blades of the forward ground-working elements projecting through the mounting bars and slots of said strips and serving as means for limiting vertical angular adjustment of the strips and as means for releasably securing the strips in a set position.

5. A plant protecting attachment for a straddle row cultivator comprising a mounting member adapted to be connected to a portion of a cultivator in depending relation thereto, a plant shielding strip pivotally connected to the lower end portion of said mounting member and extending rearwardly therefrom and means for holding the strip in adjusted position with respect to the ground; said strip being provided with an offset portion adjacent its forward end to provide a disc receiving recess.

In testimony whereof we have hereunto affixed our signatures.

CHARLES HOWARD LAMB.
WARREN B. PRATT.